United States Patent
Seenappa et al.

(10) Patent No.: US 10,070,301 B2
(45) Date of Patent: *Sep. 4, 2018

(54) INITIATING SIGNALING IN MOBILE MANAGEMENT ENTITY POOLS USING WORKFLOWS

(71) Applicant: AT&T Intellectual Property I, L.P., Atlanta, GA (US)

(72) Inventors: Vikram Seenappa, Sammamish, WA (US); Vivek Mhatre, Bellevue, WA (US); Rajendra Prasad Kodaypak, Sammamish, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/642,475

(22) Filed: Jul. 6, 2017

(65) Prior Publication Data
US 2017/0303113 A1 Oct. 19, 2017

Related U.S. Application Data

(63) Continuation of application No. 14/878,364, filed on Oct. 8, 2015, now Pat. No. 9,706,391.

(51) Int. Cl.
*H04W 8/14* (2009.01)
*H04W 16/02* (2009.01)
(Continued)

(52) U.S. Cl.
CPC ............ *H04W 8/14* (2013.01); *H04W 16/02* (2013.01); *H04W 40/246* (2013.01); *H04W 64/003* (2013.01); *H04W 88/14* (2013.01)

(58) Field of Classification Search
CPC ..... H04W 8/14; H04W 16/02; H04W 40/246; H04W 64/003; H04W 88/14
(Continued)

(56) References Cited

U.S. PATENT DOCUMENTS 8,072,900 B2 12/2011 Antal et al.
9,055,585 B2 6/2015 Lohr et al.
(Continued)

FOREIGN PATENT DOCUMENTS

EP 2866495 4/2015
WO WO 2015/126430 8/2015

OTHER PUBLICATIONS

Fukushima et al., "VNF Pool Use Cases," IETF 90, Jul. 20-25, 2014, IETF.
(Continued)

*Primary Examiner* — Cong Tran
(74) *Attorney, Agent, or Firm* — Hartman & Citrin LLC

(57) ABSTRACT

Concepts and technologies are disclosed herein for initiating signaling in mobile management entity pools using workflows. A processor can execute an orchestrator application. The processor can receive location data that indicates a geographic location at which a virtual mobility management entity has been instantiated and registered. The processor can obtain a mobility management entity topology that defines boundaries of two or more mobile management entity pools and identify, based on the location data, one of the mobility management entity pools in which the virtual mobility management entity is located. The processor can identify pool elements included in the mobility management entity pool, obtain a workflow for establishing and configuring the pool elements, and request establishment of signaling between the virtual mobile management entity and the pool elements.

20 Claims, 7 Drawing Sheets

(51) Int. Cl.
   *H04W 40/24* (2009.01)
   *H04W 64/00* (2009.01)
   *H04W 88/14* (2009.01)

(58) Field of Classification Search
   USPC .................. 455/9, 404.1–2, 418–420, 456.1
   See application file for complete search history.

(56) References Cited

U.S. PATENT DOCUMENTS

| | | |
|---|---|---|
| 2012/0266177 A1 | 10/2012 | Kakeda |
| 2012/0331545 A1 | 12/2012 | Baliga et al. |
| 2013/0051317 A1 | 2/2013 | Ji et al. |
| 2013/0150072 A1 | 6/2013 | Kapoor |
| 2014/0376454 A1 | 12/2014 | Boudreau et al. |
| 2015/0026787 A1 | 1/2015 | Zhang |
| 2015/0063166 A1 | 3/2015 | Sif et al. |
| 2015/0109995 A1 | 4/2015 | Mathai et al. |
| 2015/0124622 A1 | 5/2015 | Kovvali et al. |
| 2015/0222515 A1 | 8/2015 | Mimura et al. |
| 2016/0007138 A1 | 1/2016 | Palanisamy |
| 2016/0080172 A1 | 3/2016 | Uberoy |
| 2016/0191715 A1 | 6/2016 | Mohammed |

OTHER PUBLICATIONS

"Adding MME VNF to the MME pool procedure," 3GPP Draft, $3^{rd}$ Generation Partnership Project (3GPP), Revision S5-154335, Intel, China Mobile, ZTE, Aug. 2015, retrieved at http://www.3gpp.org/ftp/tsg_sa/WG5_TM/TSGS5_102/Docs/.

"Network Functions Virtualisation (NFV); Management and Orchestration," Group Specification, Dec. 2014, ETSI, retrieved at http://www.etsi.org/deliver/etsi_gs/NFV-MAN/001_099/001/01.01.01_60/gs_nfv-man001v010101p.pdf.

"$3^{rd}$ Generation Partnership Project; Technical Specification Group Services and System Aspects; Telecommunication management; Study on network management of virtualized networks (Release 13)," Technical Report, 3GPP TR 32.842, V13.0.0, 3GPP, Sep. 25, 2015.

International Search Report and Written Opinion dated Jan. 10, 2017 in International Application No. PCT/US2016/056036.

U.S. Office Action dated Oct. 14, 2016 in U.S. Appl. No. 14/878,364.

U.S. Notice of Allowance dated Mar. 2, 2017 in U.S. Appl. No. 14/878,364.

INITIATING SIGNALING IN MOBILE MANAGEMENT ENTITY POOLS USING WORKFLOWS

CROSS-REFERENCE TO RELATED APPLICATIONS

This application is a continuation of and claims priority to U.S. patent application Ser. No. 14/878,364, entitled "Initiating Signaling in Mobile Management Entity Pools Using Workflows," filed Oct. 8, 2015, now U.S. Pat. No. 9,706,391, which is incorporated herein by reference in its entirety.

BACKGROUND

In mobility networks, physical network function ("PNF") based network elements may be added to networks and provisioned through a process that may take hours or even days to complete based on the number of elements being instantiated, deployment configurations associated with the elements, and the like. In some instances, by the time a new PNF is activated on a network, the original need for the PNF may no longer exist. For example, an evolving network function may be provided by a version of PNFs deployed to a network. A particular version of the PNF may be obsolete when deployment is completed, in some cases, due to a rapidly evolving network, or the like.

In a long term evolution ("LTE") or LTE-Advanced network, a mobile management entity (also referred to as a "mobility management entity" or "MME") can include a centralized node. The mobile management entity can handle signaling procedures for mobile devices, for example. The mobile management entity can be deployed in standalone or pooled configurations. When deployed in pools, only specific eNodeBs in a predefined geographic area associated with the pools may establish signaling connections to the mobile management entities. Establishing the signaling can be a process that can take hours or even days to complete due to manual provisioning of the network by system administrators.

SUMMARY

The present disclosure is directed to initiating signaling in mobile management entity pools using workflows. A server computer or other computing device can execute an orchestrator application or other functionality for providing the functionality illustrated and described herein. A virtual mobile management entity can be instantiated for various purposes such as, for example, supporting particular functionality for a network, to meet demand changes associated with the network, to provide a new function to users, to change quality of service levels associated with particular resources, combinations thereof, or the like. The virtual mobile management entity can be registered with a network, and a request such as an activation request or other request can be generated to inform the orchestrator application (or other functionality) that the virtual mobile management entity has been instantiated and registered. The activation request also can specify a geographic location associated with the virtual mobile management entity.

The orchestration application can analyze the activation request to identify the geographic location of the virtual mobile management entity. The orchestration application can query or otherwise search a location database based on the determined geographic location. In some embodiments, the orchestrator application can generate virtual mobile management entity data that can capture the geographic location and submit the virtual mobile management entity data to the location database. The orchestrator application can receive or otherwise obtain a result set or other results. The results or result set can identify one or more entities associated with the geographic location associated with the virtual mobile management entity. The identified elements can include other pool elements associated with the location of the virtual mobile management entity and therefore can include pool elements and/or peer nodes associated with the virtual mobile management entity. The orchestrator application also can obtain workflows and/or configurations that can specify how signaling is to be established for the identified peer nodes (or other pool elements) and the virtual mobile management entity.

The orchestrator application can forward the workflows to various entities associated with the mobile management entity pool in which the virtual mobile management entity was instantiated. In some embodiments, for example, the workflows can be sent to one or more element management system ("EMS") entities associated with the network. The signaling between the virtual mobile management entity and the peer nodes can be established by one or more EMS entities using the workflows, if desired, and the signaling and/or peer nodes also can be configured based on configuration information that can be included with or as a part of the workflows. Thus, embodiments of the concepts and technologies described herein can enable setup of signaling for virtual mobile management entities using geographic location information associated with a newly instantiated virtual mobile management entity. These and additional features of the concepts and technologies described herein will be illustrated and described in more detail below.

According to one aspect of the concepts and technologies disclosed herein, a method is disclosed. The method can include receiving, by a processor that can execute an orchestrator application, location data that can indicate a geographic location at which a virtual mobility management entity has been instantiated and registered. The method also can include obtaining, by the processor, a mobility management entity topology that defines boundaries of two or more mobile management entity pools, identifying, by the processor and based on the location data, a one of two or more mobility management entity pools in which the virtual mobility management entity is located, and identifying, by the processor, pool elements included in the one of the two or more of mobility management entity pools. The method also can include obtaining, by the processor, a workflow for establishing and configuring the pool elements, and requesting, by the processor, establishment of signaling between the virtual mobile management entity and the pool elements.

In some embodiments, the location data can be received with a common language location identifier that can identify the virtual mobility management entity. In some embodiments, the pool elements can include peer nodes associated with the virtual mobile management entity. In some embodiments, the workflow can be obtained from an element management system via an application programming interface exposed by the element management system. In some embodiments, establishing the signaling can include sending a further application programming interface call to each of the elements, the further application programming interface call including configuration information used to establish the signaling.

In some embodiments, for example when an eNodeB is mobile and dynamic reconfiguration of mobile management entity pools is desired, the method also can include detecting a first geographic location associated with an eNodeB, the eNodeB being associated with the virtual mobile management entity; determining if the first geographic location associated with the eNodeB has changed relative to a second geographic location associated with the eNodeB, the second geographic location being determined using a location database; and in response to determining that the first geographic location has changed, identifying a new mobile management entity pool associated with the first geographic location, and adding the eNodeB to the new mobile management entity pool associated with the first geographic location.

In some embodiments, identifying the new mobile management entity pool can include mapping the first geographic location to a table stored in the location database. The table can identify mobile management entity pools and geographic locations associated with the mobile management entity pools. In some embodiments, the workflow can specify a configuration for one of the pool elements and an interface over which the signaling is to occur. In some embodiments, the workflow can include a directed graph that can be executed by an element management system to establish the signaling.

According to another aspect of the concepts and technologies disclosed herein, a system is disclosed. The system can include a processor and a memory. The memory can store computer-executable instructions that, when executed by the processor, cause the processor to perform operations. The operations can include receiving location data that can indicate a geographic location at which a virtual mobility management entity has been instantiated and registered, obtaining a mobility management entity topology that defines boundaries of two or more mobile management entity pools, identifying, by the processor and based on the location data, a one of two or more mobility management entity pools in which the virtual mobility management entity is located, identifying pool elements included in the one of the two or more mobility management entity pools, obtaining a workflow for establishing and configuring the pool elements, and requesting establishment of signaling between the virtual mobile management entity and the pool elements.

In some embodiments, the pool elements can include peer nodes associated with the virtual mobile management entity. In some embodiments, the eNodeB can be mobile. In some embodiments, the computer-executable instructions, when executed by the processor, cause the processor to perform additional operations. The additional operations can include detecting a first geographic location associated with an eNodeB, the eNodeB being associated with the virtual mobile management entity; determining if the first geographic location associated with the eNodeB has changed relative to a second geographic location associated with the eNodeB, the second geographic location being determined using a location database; and in response to determining that the first geographic location has changed, identifying a new mobile management entity pool associated with the first geographic location, and adding the eNodeB to the new mobile management entity pool associated with the first geographic location.

In some embodiments, identifying the new mobile management entity pool can include mapping the first geographic location to a database table stored in the location database. The table can identify mobile management entity pools and geographic locations associated with the mobile management entity pools. In some embodiments, the workflow can be obtained from an element management system via an application programming interface exposed by the element management system. In some embodiments, establishing the signaling can include sending a further application programming interface call to each of the elements, the further application programming interface call including configuration information used to establish the signaling.

According to yet another aspect, a computer storage medium is disclosed. The computer storage medium can have computer-executable instructions stored thereon. When the computer-executable instructions are executed by a processor, the processor can perform operations. The operations can include receiving location data that can indicate a geographic location at which a virtual mobility management entity has been instantiated and registered; obtaining a mobility management entity topology that defines boundaries of two or more mobile management entity pools; identifying, by the processor and based on the location data, a one of two or more mobility management entity pools in which the virtual mobility management entity is located; identifying pool elements included in the one of the two or more mobility management entity pools; obtaining a workflow for establishing and configuring the pool elements; and requesting establishment of signaling between the virtual mobile management entity and the pool elements.

In some embodiments, the pool elements can include peer nodes associated with the virtual mobile management entity. In some embodiments, the eNodeB can be mobile. In some embodiments, the computer-executable instructions, when executed by the processor, cause the processor to perform additional operations. The additional operations further can include detecting a first geographic location associated with an eNodeB, the eNodeB being associated with the virtual mobile management entity; determining if the first geographic location associated with the eNodeB has changed relative to a second geographic location associated with the eNodeB, the second geographic location being determined using a location database; and in response to determining that the first geographic location has changed, identifying a new mobile management entity pool associated with the first geographic location, and adding the eNodeB to the new mobile management entity pool associated with the first geographic location.

In some embodiments, identifying the new mobile management entity pool can include mapping the first geographic location to a table stored in the location database. The table can identify mobile management entity pools and geographic locations associated with the mobile management entity pools. In some embodiments, the workflow can be obtained from an element management computer storage medium via an application programming interface exposed by the element management computer storage medium, and establishing the signaling can include sending a further application programming interface call to each of the elements, the further application programming interface call including configuration information used to establish the signaling.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
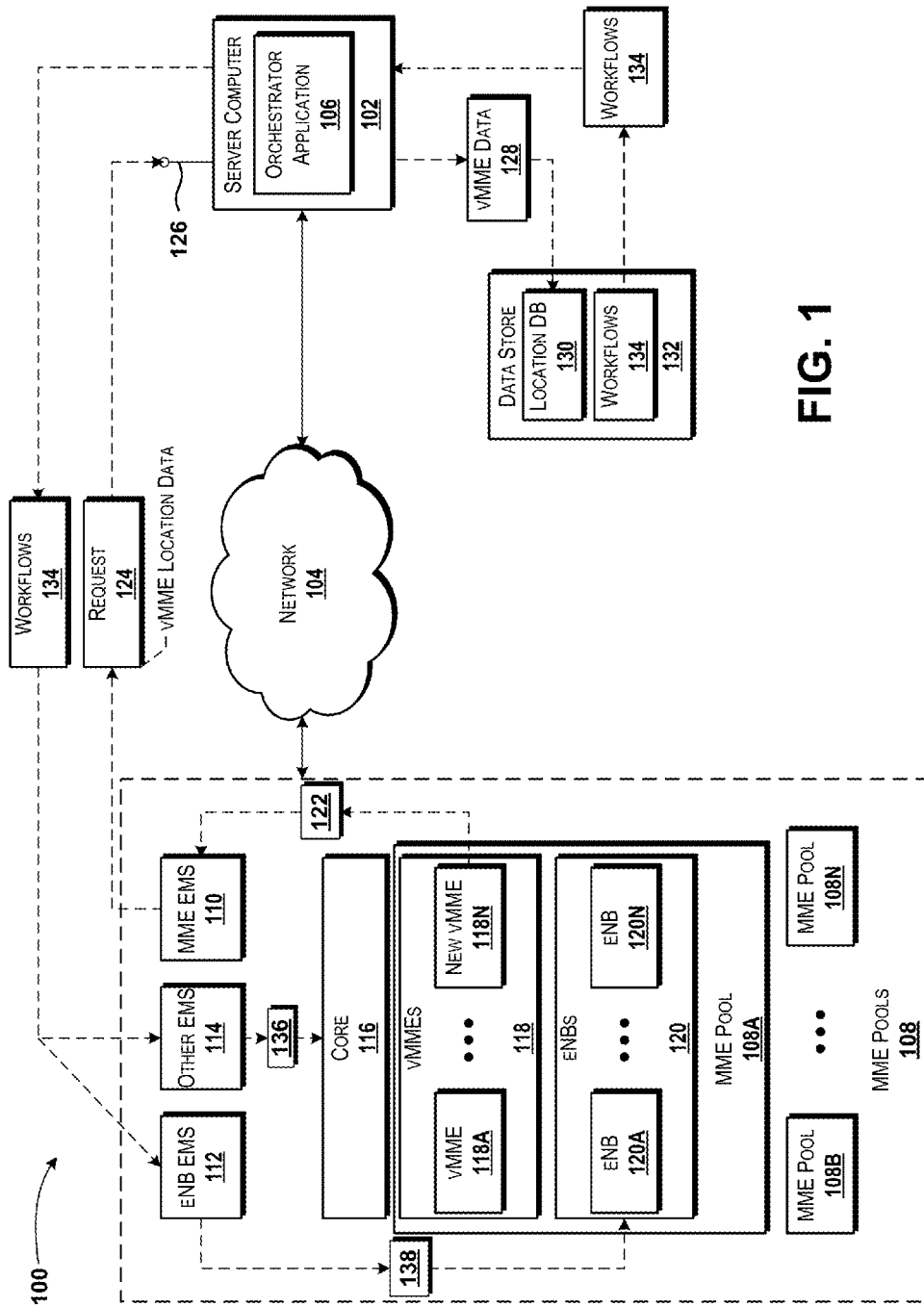
FIG. 1 is a system diagram illustrating an illustrative operating environment for various embodiments of the concepts and technologies described herein.

The following detailed description is directed to initiating signaling in mobile management entity pools using workflows. A server computer or other computing device can execute an orchestrator application or other functionality for providing the functionality illustrated and described herein. A virtual mobile management entity can be instantiated for various purposes such as, for example, supporting particular functionality for a network, to meet demand changes associated with the network, to provide a new function to users, to change quality of service levels associated with particular resources, combinations thereof, or the like. The virtual mobile management entity can be registered with a network, and a request such as an activation request or other request can be generated to inform the orchestrator application (or other functionality) that the virtual mobile management entity has been instantiated and registered. The activation request also can specify a geographic location associated with the virtual mobile management entity.

The orchestration application can analyze the activation request to identify the geographic location of the virtual mobile management entity. The orchestration application can query or otherwise search a location database based on the determined geographic location. In some embodiments, the orchestrator application can generate virtual mobile management entity data that can capture the geographic location and submit the virtual mobile management entity data to the location database. The orchestrator application can receive or otherwise obtain a result set or other results. The results or result set can identify one or more entities associated with the geographic location associated with the virtual mobile management entity. The identified elements can include other pool elements associated with the location of the virtual mobile management entity and therefore can include pool elements and/or peer nodes associated with the virtual mobile management entity. The orchestrator application also can obtain workflows and/or configurations that can specify how signaling is to be established for the identified peer nodes (or other pool elements) and the virtual mobile management entity.

The orchestrator application can forward the workflows to various entities associated with the mobile management entity pool in which the virtual mobile management entity was instantiated. In some embodiments, for example, the workflows can be sent to one or more element management system ("EMS") entities associated with the network. The signaling between the virtual mobile management entity and the peer nodes can be established by one or more EMS entities using the workflows, if desired, and the signaling and/or peer nodes also can be configured based on configuration information that can be included with or as a part of the workflows. Thus, embodiments of the concepts and technologies described herein can enable setup of signaling for virtual mobile management entities using geographic location information associated with a newly instantiated virtual mobile management entity. These and additional features of the concepts and technologies described herein will be illustrated and described in more detail below.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for initiating signaling in mobile management entity pools using workflows will be described, according to an illustrative embodiment. The operating environment 100 shown in FIG. 1 includes a server computer 102. The server computer 102 can operate in communication with and/or as part of a communications network ("network") 104, though this is not necessarily the case.

According to various embodiments, the functionality of the server computer 102 may be provided by one or more server computers, desktop computers, mobile telephones, laptop computers, set-top boxes, other computing systems, and the like. It should be understood that the functionality of the server computer 102 can be provided by a single device, by two similar devices, and/or by two or more dissimilar devices. For purposes of describing the concepts and technologies disclosed herein, the server computer 102 is described herein as a server computer that includes a processor and a memory. It should be understood that this embodiment is illustrative, and should not be construed as being limiting in any way.

The server computer 102 can execute an operating system (not shown in FIG. 1) and one or more application programs such as, for example, an orchestrator application 106. The operating system can include a computer program for controlling the operation of the server computer 102. The orchestrator application 106 can include an executable program configured to execute on top of the operating system to provide various functions illustrated and described herein for initiating signaling in mobile management entity pools using workflows. In some embodiments, the server computer 102 also can execute management application or module, though in the illustrated embodiment the management functionality is provided by the orchestrator application 106. Because the management functionality can be provided by other entities, modules, or the like, it should be understood that the illustrated example embodiment is illustrative and therefore should not be construed as being limiting in any way.

The orchestrator application 106 can be configured to manage one or more mobile management entity ("MME") pools 108A-N (hereinafter collectively and/or generically referred to as "mobile management entity pools 108"), and to instantiate and/or configure one or more components of the mobile management entity pools 108 as illustrated and described in more detail below. As shown in FIG. 1, the mobile management entity pools 108 can include various components (illustrated only with respect to the mobile management entity pool 108A for the sake of clarity). It should be understood that this example is illustrative and therefore should not be construed as being limiting in any way.

As shown, one or more of the mobile management entity pools 108 can include one or more element management system ("EMS") entities. According to various embodiments of the concepts and technologies described herein, the mobile management entity pools 108 can include a mobile management entity ("MME") EMS 110, an eNodeB ("eNB") EMS 112, and one or more other EMS entities (labeled "other EMS" in FIG. 1) 114. Before describing the functions of these EMS entities, the other components of the mobile management entity pools 108 will be defined.

The mobile management entity pools 108 also can be associated with various core elements, which can be part of a core 116. The core 116 can include, but is not limited to, one or more broadcast/multicast control ("BMC") entities; one or more evolved serving mobile location center ("ES-LMC") entities; one or more gateway mobile location center ("GMLC") entities; one or more mobile switching center ("MSC") entities; one or more dynamic resource allocation ("DRA") entities; one or more home subscriber server ("HSS") entities; and/or other entities. Because the function of the core 116 and/or the various elements of the core 116 are generally understood, these elements will not be further described herein.

The mobile management entity pools 108 also can include a pool of virtual mobile management entities 118A-N (hereinafter collectively and/or generically referred to as "virtual mobile management entities 118"). As shown in FIG. 1, the virtual mobile management entity 118N is labeled as a "new virtual mobile management entity." This designation will be further understood with reference to the description herein. It should be understood, however, that the new virtual mobile management entity 118N can be substantially similar (or even identical) to the virtual mobile management entity 118A, and that the word "new" can be used solely to refer to a recent instantiation of the new virtual mobile management entity 118N and/or a recent addition of the virtual mobile management entity 118N to a mobile management entity pool 108. It should be understood that this example is illustrative and therefore should not be construed as being limiting in any way.

The mobile management entity pools 108 also can include one or more eNodeBs ("eNBs") 120A-N (hereinafter collectively and/or generically referred to as "eNodeBs 120"). According to various embodiments of the concepts and technologies described herein, the virtual mobile management entities 118 can serve as control nodes for one or more of the eNodeBs 120. The virtual mobile management entities 118 also can provide and/or include other functionality and therefore can be provisioned at various times to the enhance features of a network in which the virtual mobile management entities 118 are provisioned. As is generally understood, network operators can design networks with virtual mobile management entity 118 overlap, e.g., eNodeBs 120 can be served by one or more virtual mobile management entities 118 in some embodiments, though this is not the case. Thus, it can be appreciated that a particular virtual mobile management entity 118 may serve one or more eNodeBs 120 and/or that a particular eNodeB 120 may be served by one or more virtual mobile management entities 118. The eNodeBs 120 can provide radio access to various devices, as is generally understood.

According to various embodiments of the concepts and technologies described herein, the new virtual mobile management entity 118N can be instantiated at some time. As mentioned above, the new virtual mobile management entity 118N may be instantiated to add functionality to a network, to add control functionality to a mobile management entity pool 108, and/or for other reasons such as meeting a demand increase (detected or expected), detecting movement of radio resources (e.g., eNodeBs 120) in a network, or the like.

According to various embodiments of the concepts and technologies described herein, the mobile management entity EMS 110 can receive or otherwise obtain a virtual mobile management entity activation indication ("activation indication") 122. The activation indication 122 can indicate, to the mobile management entity EMS 110 that the new virtual mobile management entity 118N is activated. According to various embodiments, the activation indication 122 also can include geographic location information (e.g., latitude and longitude coordinates) associated with the new virtual mobile management entity 118N. It should be understood that this example is illustrative and therefore should not be construed as being limiting in any way.

The mobile management entity EMS 110 can create and route an activation request 124 (labeled "request 124" in FIG. 1) to the server computer 102. The activation request 124 also can request instantiation of signaling between the new virtual mobile management entity 118N and other elements of the mobile management entity pool 108. According to various embodiments of the concepts and technologies described herein, the activation request 124 can include virtual mobile management entity location data (labeled "VMME location data" in FIG. 1). The virtual mobile management entity location data can indicate the geographic location associated with the new virtual mobile management entity 118N and therefore can be determined from the activation indication 122, in some embodiments. In some embodiments, the virtual mobile management entity location data can indicate a geographic location of a host of the new virtual mobile management entity 118N. This information can be used for various purposes, as will be explained in more detail below. The activation request 124 also can include data that can indicate that the new virtual mobile management entity 118N has been instantiated and registered. It should be understood that this example is illustrative and therefore should not be construed as being limiting in any way.

The server computer 102 (e.g., via execution of the orchestrator application 106) can receive the activation request 124. In some embodiments, the activation request 124 can be received by the orchestrator application 106 via an application programming interface ("API") 126. The API 126 can be exposed by the server computer 102, in some embodiment. Because the activation request 124 can be obtained by the orchestrator application 106 in other manners and/or via other interfaces, it should be understood that this embodiment is illustrative and therefore should not be construed as being limiting in any way.

The orchestrator application 106 also can extract, from the activation request 124, various types of information and/or data relating to the new virtual mobile management entity 118N. The orchestrator application 106 can package this information as the virtual mobile management entity data 128 (labeled "vMME data 128" in FIG. 1). The orchestrator application 106 also can provide the virtual mobile management entity data 128 to a location database 130 (labeled "location DB 130" in FIG. 1).

According to various embodiments of the concepts and technologies described herein, the location database 130 can be stored at a data storage device such as the data store 132. The functionality of the data store 132 can be provided by one or more databases, server computers, desktop computers, mobile telephones, laptop computers, other computing systems, and the like. In the illustrated embodiments, the functionality of the data store 132 is provided by a server computer that hosts the location database 130. It should be understood that this example is illustrative and therefore should not be construed as being limiting in any way.

The location database 130 can be updated by the virtual mobile management entity data 128. In particular, the location database 130 can indicate geographic locations of components and/or entities of or associated with the mobile management entity pools 108. As such, the virtual mobile management entity data 128 can be used to update the location database 130 to include the new virtual mobile management entity 118N and/or to indicate the geographic location of the new virtual mobile management entity 118N. The location database 130 also can be queried by way of the virtual mobile management entity data 128 to determine other elements associated with the geographic location of the new virtual mobile management entity 118N. In particular, the location database 130 can be queried using the virtual mobile management entity data 128 to determine a mobile management entity pool 108 in which the new virtual mobile management entity 118N is located and/or other elements associated with that mobile management entity pool 108.

According to various embodiments, the orchestrator application 106 can also obtain, in response to submitting the virtual mobile management entity data 128, one or more workflows 134 associated with the mobile management entity pool 108 to which the new virtual mobile management entity 118N belongs. The workflows 134 can identify pool elements (e.g., entities in the core 116, virtual mobile management entities 118, eNodeBs 120, and the like) and provide information that can be used by the orchestrator application 106 to instantiate signaling between and/or among these pool elements and the new virtual mobile management entity 118N. In some contemplated embodiments, the workflows 134 can include directed graphs that can be executed or processed by various entities (e.g., the EMS entities) to instantiate and/or configure peer nodes, to establish signaling over specific interfaces, combinations thereof, or the like. According to various embodiments of the concepts and technologies described herein, the pool elements can include one or more peer nodes associated with the new virtual mobile management entity 118N. It should be understood that this example is illustrative and therefore should not be construed as being limiting in any way.

As such, it can be appreciated that in response to receiving the activation request 124, the orchestrator application 106 can obtain the workflows 134 from the data store 132. More details of how the workflows 134 are used by the orchestrator application 106 will be provided below. As shown in FIG. 1, however, it can be appreciated that the orchestrator application 106 can forward the workflows 134 to the eNodeB EMS 112 and/or other EMS 114.

The other EMS 114 can receive the workflows 134 from the orchestrator application 106 and create core commands 136. The core commands 136 can be sent to each of the peer nodes of the new virtual mobile management entity 118N. The core commands 136 can include configuration information that can be used by the peer nodes to establish signaling between the peer nodes and the new virtual mobile management entity 118N. Thus, it can be appreciated that the core commands 136 can prepare the peer nodes of the new virtual mobile management entity 118N for signaling with the peer nodes.

The eNodeB EMS 112 can create signaling commands 138. The signaling commands 138 can be sent by the eNodeB EMS 112 to setup the signaling between the eNodeBs 120, the new virtual mobile management entity 118N, and the various pool elements of the mobile management entity pool 108. Thus, it can be appreciated that the orchestrator application 106 can instantiate the signaling between various elements of the mobile management entity pool 108 and/or the new virtual mobile management entity 118N by way of providing the workflows 134 to one or more the EMS entities. It should be understood that this example is illustrative and therefore should not be construed as being limiting in any way.

Because signaling can be instantiated between the new virtual mobile management entity 118N and other pool elements via workflows 134 that are identified based on the geographic location of the new virtual mobile management entity 118N, the signaling can be instantiated in a matter of minutes. These workflows 134 therefore can provide benefits such as short setup times for virtual mobile management entities 118 added to mobile management entity pools 108 and/or quick activation of new virtual network functions that may be embodied by the virtual mobile management entities 118. It should be understood that this example is illustrative and therefore should not be construed as being limiting in any way.

According to various embodiments of the concepts and technologies described herein, the workflows can establish the signaling between the peer nodes and the new virtual mobile management entity 118N over specific interfaces. In particular, the workflows can be used to establish signaling between eNodeBs 120 and/or other elements of the mobile management entity pools 108 using and/or via specific interfaces associated with the mobile management entity pools 108. TABLE 1 shows a list of example interfaces over which the signaling can be established in accordance with various embodiments of the concepts and technologies described herein. It should be understood that this list of interfaces is not exhaustive and therefore should be viewed as illustrative and not limiting in any way.

TABLE 1

| vMME (3GPP) | 3GPP Interface | 3GPP peer Node | Layer 4/3 | Details |
| --- | --- | --- | --- | --- |
| vMME | S1-MME | eNB | SCTP/IP | Signaling |
| vMME | M3 | eNB | SCTP/IP | eMBMS signaling |
| vMME | S6a | DRA/HSS | Diameter/SCTP/IP | Signaling |
| vMME | SLg | DRA/GMLC | Diameter/SCTP/IP | Signaling |
| vMME | SLs | ESMLC | SCTP/IP | Signaling |

TABLE 1-continued

| vMME (3GPP) | 3GPP Interface | 3GPP peer Node | Layer 4/3 | Details |
|---|---|---|---|---|
| vMME | SBc | BMC | SCTP/IP | Signaling |
| vMME | SGs | MSC | SCTP/IP | Signaling |
| vMME | Sm | eMBMS GW | GTPv2c/IP | Signaling |
| vMME | S11 | S-GW | GTPv2c/IP | Signaling |
| vMME | S3 | S4 SGSN | GTPv2c/IP | Signaling |
| vMME | S10 | vMME/MME | GTPv2c/IP | Signaling |
| vMME | Gn | SGSN | GTPv1/IP | Signaling |
| vMME | Sv | MSC | GTPv2c/IP | Signaling |
| vMME | DNS | DNS | UDP/TCP/IP | Signaling |
| vMME | X2 | Lawful Interception GW | TCP | Signaling |
| vMME | NTP/Node Statistics | NTP/Network Statistics Real time | TCP | Signaling |

In practice, a virtual mobile management entity 118 can be instantiated for various purposes. According to various embodiments, the virtual mobile management entity 118 can be instantiated to support particular functionality, to meet demand changes, combinations thereof, or the like. The virtual mobile management entity 118 can be registered with a network, and a request such as an activation request 124 or other request can be generated to inform an orchestrator application 106 or other functionality that the virtual mobile management entity 118 has been instantiated and registered. The activation request 124 also can specify a geographic location associated with the virtual mobile management entity 118.

The orchestrator application 106 can analyze the activation request 124 to identify the geographic location of the virtual mobile management entity 118. The orchestrator application 106 can query or otherwise search a location database 130 based on the determined geographic location. In some embodiments, the orchestrator application 106 can generate virtual mobile management entity data 128 that can capture the geographic location and submit the virtual mobile management entity data 128 to the location database 130. It should be understood that this example is illustrative and therefore should not be construed as being limiting in any way.

The orchestrator application 106 can receive a result set or other results that can identify one or more entities associated with the geographic location associated with the virtual mobile management entity 118. The identified elements can include other pool elements associated with the location of the virtual mobile management entity 118 and therefore can include peer elements and/or peer nodes associated with the virtual mobile management entity 118. The orchestrator application 106 also can obtain workflows 134 and/or configurations that can specify how signaling is to be established for the identified peer nodes (or other pool elements) and the virtual mobile management entity 118.

The orchestrator application 106 can forward the workflows 134 to various entities associated with the mobile management entity pool 108 in which the virtual mobile management entity 118 was instantiated. The signaling between the virtual mobile management entity 118 and the peer nodes can be established by one or more EMS entities 110, 112, 114 using the workflows, if desired. Thus, embodiments of the concepts and technologies described herein can enable setup of signaling for virtual mobile management entities 118 using only geographic location information associated with a newly instantiated virtual mobile management entity 118. These and additional features of the concepts and technologies described herein will be illustrated and described in more detail below.

FIG. 1 illustrates one server computer 102, one network 104, three mobile management entity pools 108, and one data store 132. It should be understood, however, that various implementations of the operating environment 100 can include zero, one, or more than one server computer 102; zero, one, or more than one network 104; zero, one, two, three, or more than three mobile management entity pools 108; and/or zero, one, or more than one data store 132. As such, the illustrated embodiment should be understood as being illustrative, and should not be construed as being limiting in any way.

Figure 2:
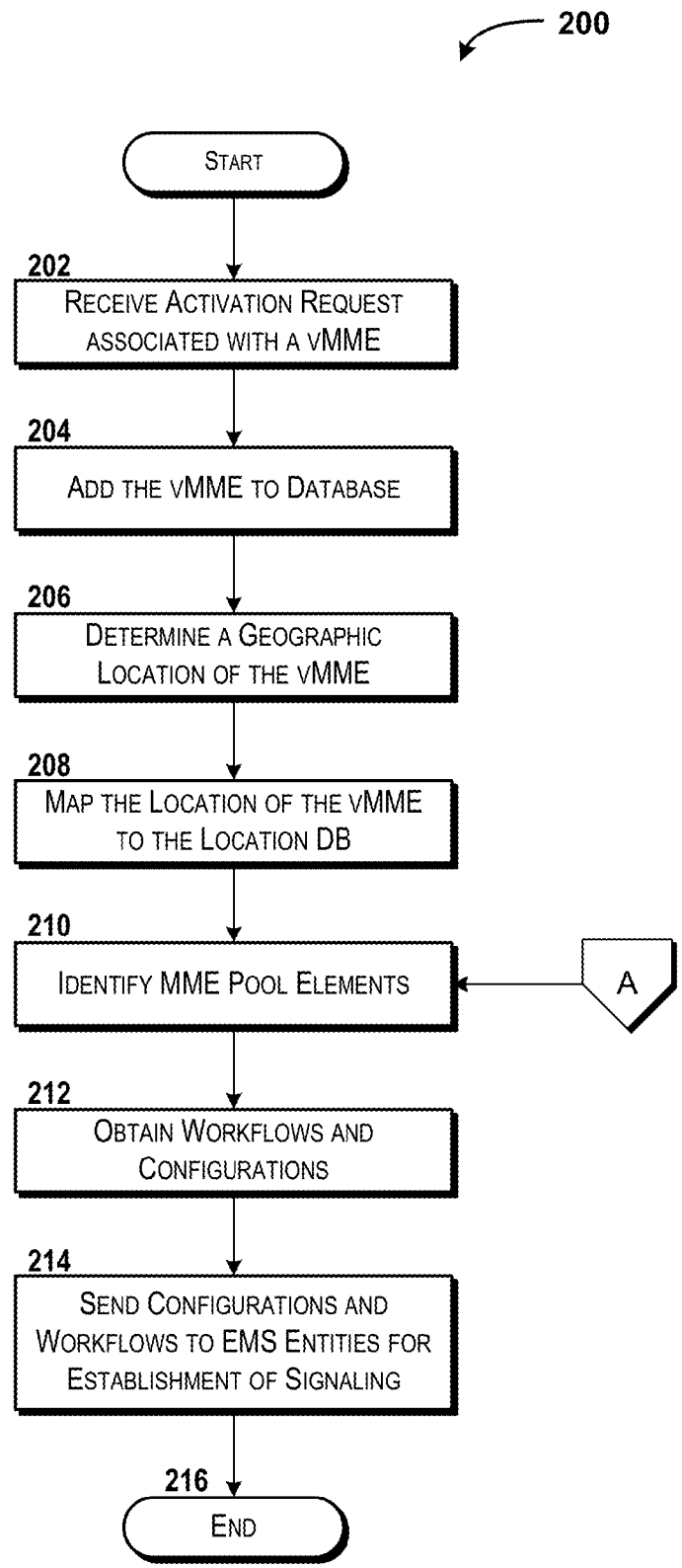
FIG. 2 is a flow diagram showing aspects of a method for initiating signaling associated with a virtual mobility management entity, according to an illustrative embodiment of the concepts and technologies described herein.

Turning now to FIG. 2, aspects of a method 200 for initiating signaling associated with a virtual mobility management entity will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 102 to perform one or more operations and/or causing the processor to direct other components of the computing system or device to perform one or more of the operations.

For purposes of illustrating and describing the concepts of the present disclosure, the methods disclosed herein are described as being performed by the server computer 102 via execution of one or more software modules such as, for example, the orchestrator application 106. It should be understood that additional and/or alternative devices and/or network nodes can provide the functionality described herein via execution of one or more modules, applications, and/or other software including, but not limited to, the orchestrator application 106. Thus, the illustrated embodiments are illustrative, and should not be viewed as being limiting in any way.

The method 200 begins at operation 202. At operation 202, the server computer 102 can receive an activation request associated with a virtual mobile management entity 118. According to various embodiments, the activation request received in operation 202 can be similar or even identical to the activation request 124 illustrated and described above with reference to FIG. 1. As such, it can be appreciated that the activation request 124 can be obtained by the server computer 102 via an API 126, though this is not necessarily the case. Furthermore, it can be appreciated that the activation request 124 can include geographic location data that identifies a geographic location associated with the virtual mobile management entity 118. The activation request 124 also can include an indication that one or more virtual mobile management entity 118 has been instantiated and registered. It should be understood that this example is illustrative and therefore should not be construed as being limiting in any way.

From operation 202, the method 200 can proceed to operation 204. At operation 204, the server computer 102 can add the virtual mobile management entity 118 associated with the activation request received in operation 202 to a database. In various embodiments, the server computer 102 can add data describing the virtual mobile management entity 118 to a location database such as the location database 130 illustrated and described in FIG. 1. The location database 130 can include a topology of the mobile management entity pools 108, as well as location information identifying geographic locations of one, more than one, and/or all elements of the mobile management entity pools 108.

According to various embodiments, names of the pool elements can include a common language location identifier ("CLLI") and/or other information that can identify the geographic locations of the pool elements. According to various embodiments of the concepts and technologies described herein, the virtual mobile management entities 118 can be named such that a portion of the name identifies a respective geographic location of the virtual mobile management entities 118. Because the locations of elements of the mobile management entity pools 108 can be identified and/or represented in additional and/or alternative ways, it should be understood that these examples are illustrative and therefore should not be construed as being limiting in any way.

From operation 204, the method 200 can proceed to operation 206. At operation 206, the server computer 102 can determine a geographic location associated with the virtual mobile management entity 118 associated with the activation request received or otherwise obtained in operation 202. According to various embodiments, the server computer 102 can extract the geographic location from the activation request 124. In some other embodiments, the server computer 102 can query the location database 130 and receive the geographic location in response to the query. In some embodiments, for example, the server computer 102 can generate virtual mobile management entity data 128 and use the virtual mobile management entity data 128 to query the location database 130 to obtain the location information associated with the virtual mobile management entity 118. Because the location of the virtual mobile management entity 118 can be determined in additional and/or alternative manners, it should be understood that these examples are illustrative and therefore should not be construed as being limiting in any way.

From operation 206, the method 200 can proceed to operation 208. At operation 208, the server computer 102 can map the location of the virtual mobile management entity 118 determined in operation 206 to the location database 130. In some embodiments, the server computer 102 can query the location database 130 using the location determined in operation 206 and/or otherwise match or map data in the location database 130 to the location determined in operation 206. In some embodiments, for example, the server computer 102 can query the location database 130 using the location determined in operation 206, and the data store 132 (or other entity) can return a result set that includes any pool elements that correspond to the location used to query the location database 130.

Figure 7:
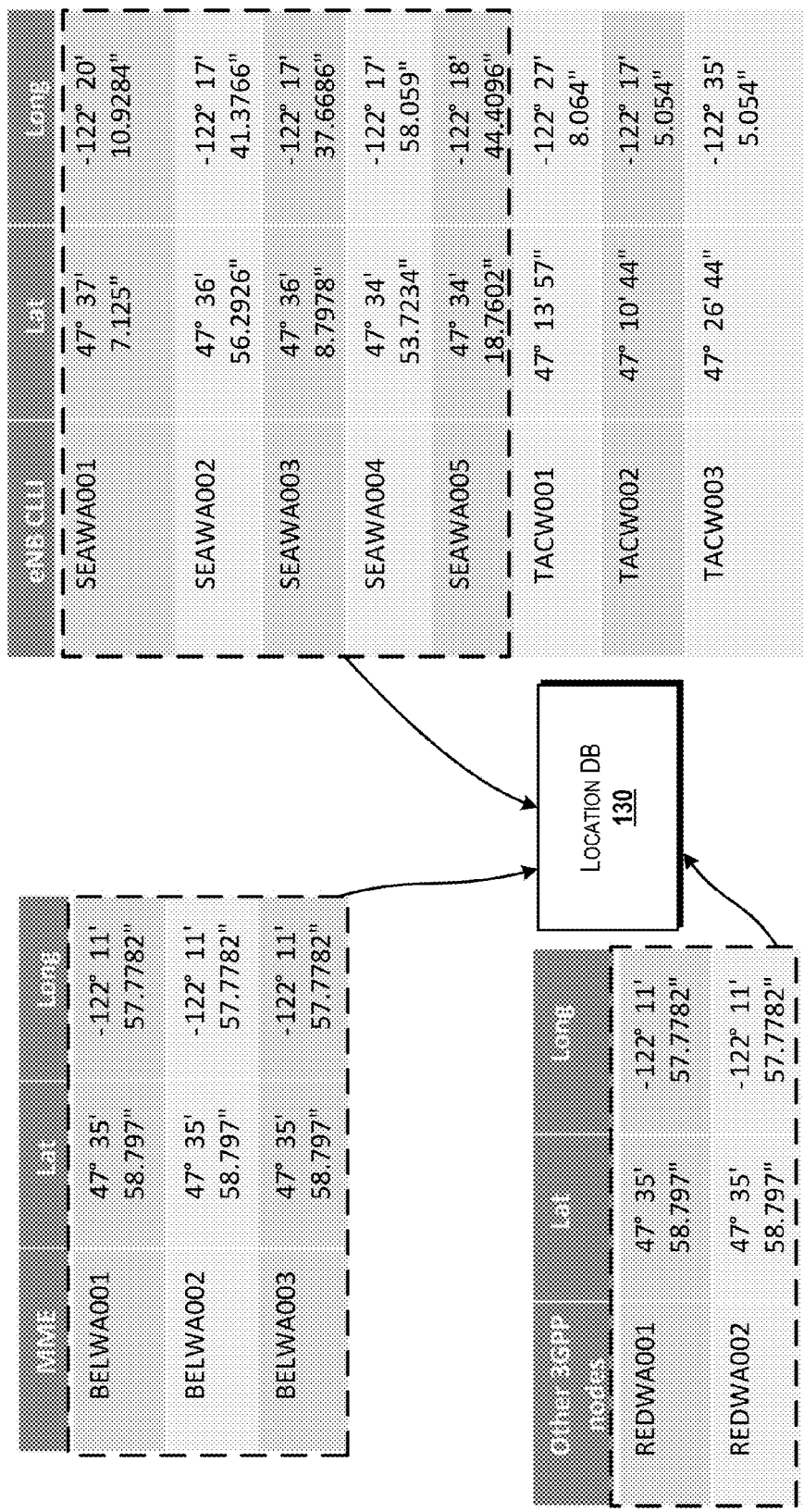
FIG. 7 is a line diagram schematically illustrating mapping of geographic location information to tables in a location database, according to some illustrative embodiments of the concepts and technologies described herein.

An example of mapping locations using the location database 130 is schematically shown in FIG. 7. As shown, the location database 130 can include one or more tables of data, and the multiple tables can include and/or represent location information, pool element identifiers (e.g., CLLI names, or other identifiers), and the like. As shown in FIG. 7, the geographic location information can be provided as latitude and longitude information, though this example is illustrative. In mapping locations, the server computer 102 can identify a geographic location of one or more entities (e.g., the virtual mobile management entity 118 named BELWA001) and identify other pool elements associated with that location. As shown in FIG. 7, other pool elements associated with the geographic location of the virtual mobile management entity 118 named BELWA001 include the virtual mobile management entities 118 named BELWA002 and BELWA03, the 3GPP nodes REDWA001 and REDWA002, and eNodeBs 120 with CLLI names SEAWA001, SEAWA002, SEAWA003, SEAWA004, and SEAWA005. Because identifying elements associated with a particular location can be done in additional and/or alternative manners, it should be understood that this example is illustrative and therefore should not be construed as being limiting in any way.

From operation 208, the method 200 can proceed to operation 210. At operation 210, the server computer 102 can identify one or more elements of a mobile management entity pool 108 in which the virtual mobile management entity 118 is located. It can be appreciated that the one or more elements can be identified from a result set (if a result set is provided in operation 208) and/or otherwise identified from the location database 130. In operation 210, the server computer 102 can identify peer nodes for the virtual mobile management entity 118. Thus, operation 210 can result in a list of peer nodes of the virtual mobile management entity 118 for which signaling is to be initiated as illustrated and described herein. It should be understood that this example is illustrative and therefore should not be construed as being limiting in any way.

In some embodiments of operation 210, the server computer 102 can obtain a list of pool elements (e.g., peer nodes) as a result set. Thus, the server computer 102 can use the geographic location determined in operation 206 to identify one or more pool elements (e.g., peer nodes) associated with a particular location and therefore the virtual mobile management entity 118 associated with the activation request 124 received in operation 202. Because the pool elements associated with a particular location and/or virtual mobile management entity 118 can be determined in additional and/or alternative manners, it should be understood that this example is illustrative and therefore should not be construed as being limiting in any way.

From operation 210, the method 200 can proceed to operation 212. At operation 212, the server computer 102 can obtain workflows 134 and configurations associated with one or more of the pool elements identified in operation 210. Thus, in operation 212 the server computer 102 can receive configurations for the peer nodes or other pool elements identified in operation 210, as well as workflows 134 that can be used to establish signaling as illustrated and described herein. As explained above, the workflows 134 can detail signaling to be set up for each of the pool elements, interfaces to be used for the signaling, combinations thereof, or the like. It should be understood that these examples are illustrative and therefore should not be construed as being limiting in any way.

From operation 212, the method 200 can proceed to operation 214. At operation 214, the server computer 102 can send the configurations and the workflows 134 obtained in operation 212 to the EMS entities (e.g., the eNodeB EMS 112 and the other EMS 114). The EMS entities can use the workflows 134 and the configurations to configure the pool elements (e.g., peer nodes of the virtual mobile management entity 118) and/or to establish signaling between the pool elements and the virtual mobile management entity 118. It can be appreciated that in some embodiments of the concepts and technologies described herein, the EMS entities can establish the signaling over the particular interfaces as illustrated and described above, and as such the functionality of operation 214 can include the server computer 102 sending the configurations and/or workflows to the EMS entities. Thus, the server computer 102 can perform operations 202-214 to initiate signaling between a virtual mobile management entity 118 and peer nodes of the virtual mobile management entity 118, in some embodiments.

From operation 214, the method 200 can proceed to operation 216. The method 200 can end at operation 216.

Figure 3:
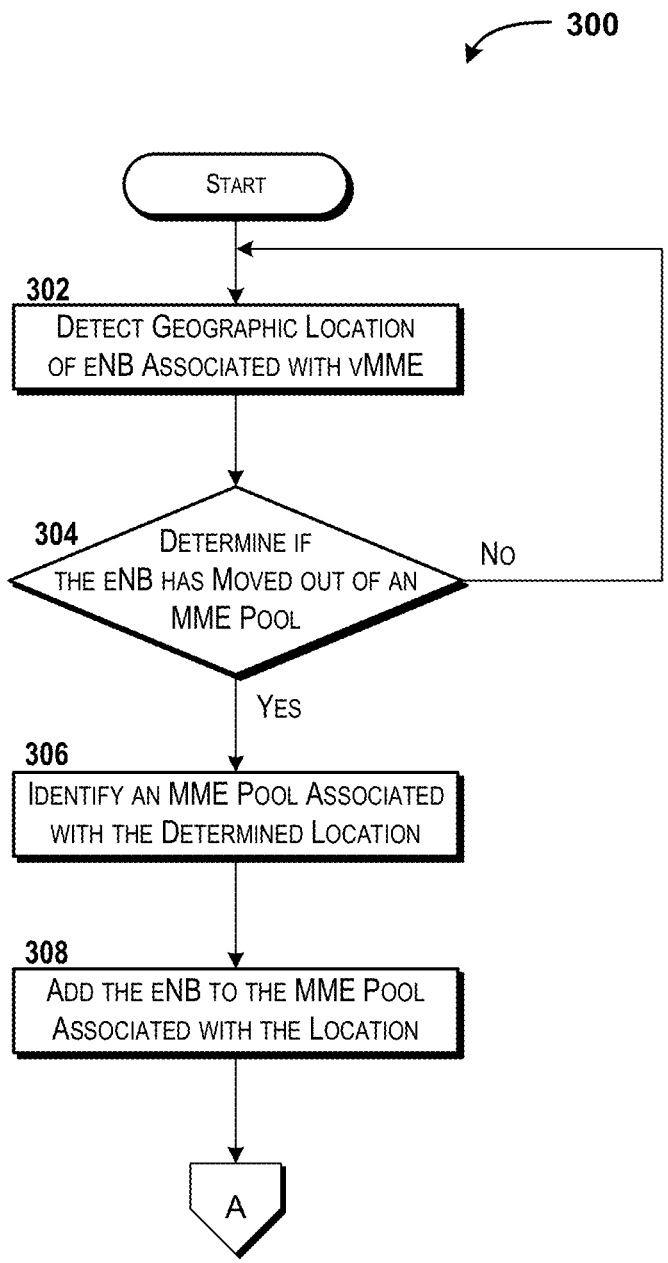
FIG. 3 is a flow diagram showing aspects of a method for updating signaling associated with a virtual mobility management entity, according to an illustrative embodiment of the concepts and technologies described herein.

Turning now to FIG. 3, aspects of a method 300 for updating signaling associated with a virtual mobility management entity will be described in detail, according to an illustrative embodiment. The method 300 can begin at operation 302. At operation 302, the server computer 102 can determine a geographic location of an eNodeB 120. According to various embodiments of the concepts and technologies described herein, the eNodeBs 120 can be a mobile eNodeB 120 and therefore can have a geographic location that can change over time. For example, the functionality of the eNodeBs 120 can be provided by one or more drones, one or more mobile vehicles, one or more satellites, combinations thereof, or the like, wherein these or other types of entities can move with respect to geographic location over time. Thus, the location of the eNodeBs 120 can be monitored to determine if and when the eNodeBs 120 leave a region served by a mobile management entity pool 108 or otherwise move to a new geographic location.

Figure 4:
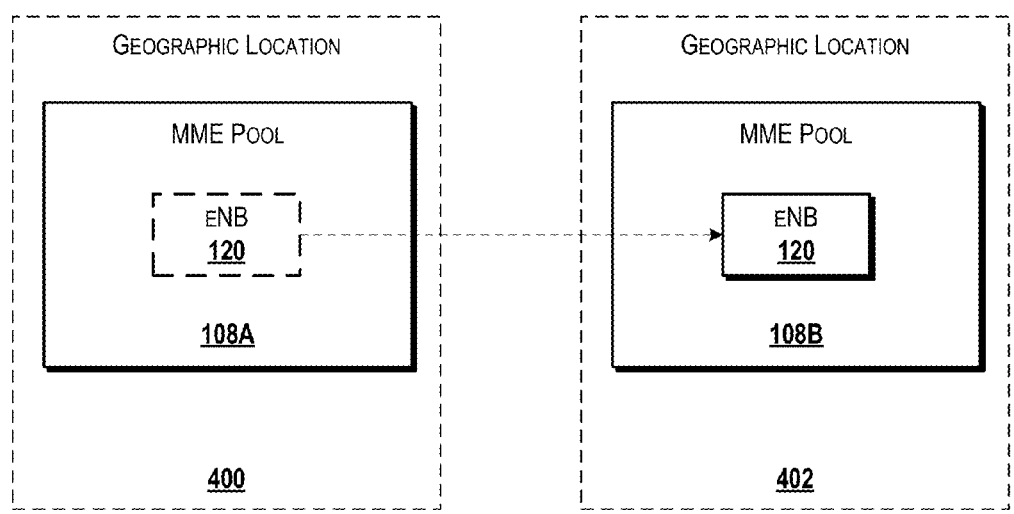
FIG. 4 schematically illustrates an example of an eNodeB moving from a first geographic location to a second geographic location, according to an example embodiment of the concepts and technologies described herein.

FIG. 4 schematically illustrates an example of an eNodeB 120 moving from a first geographic location 400 to a second geographic location 402. As shown in FIG. 4, the first geographic location 400 may be served by a first mobile management entity pool 108A, and the second geographic location 402 may be served by a second mobile management entity pool 108B. Thus, the eNodeB 120 may move from the first mobile management entity pool 108A to the second mobile management entity pool 108B by way of moving from the first geographic location 400 to the second geographic location 402. It should be understood that this example is illustrative and therefore should not be construed as being limiting in any way.

From operation 302, the method 300 can proceed to operation 304. At operation 304, the server computer 102 can determine if the eNodeB 120 has moved out of a mobile management entity pool 108 with which the eNodeB 120 is associated. According to various embodiments, the server computer 102 can query the location database 130 with information identifying the eNodeB 120 and obtain a location associated with the eNodeB 120. The server computer 102 can compare the location obtained from the location database 130 to the location determined in operation 302 and determine if the locations match. If the locations do not match, the server computer 102 can determine that the eNodeB 120 has moved out of an associated mobile management entity pool 108. Because the server computer 102 can determine that the eNodeB 120 has moved out of a mobile management entity pool 108 in additional and/or alternative manners, it should be understood that this example is illustrative and therefore should not be construed as being limiting in any way.

It should be appreciated that in some embodiments of the method 300, the server computer 102 can determine if the eNodeB 120 has moved to a new geographic location instead of, or in addition to, determining if the eNodeB 120 has moved out of a mobile management entity pool 108. As such, the embodiment of the method 300 illustrated and described in FIG. 3 is illustrative and should not be construed as being limiting in any way.

If the server computer 102 determines, in operation 304, that the eNodeB 120 has not moved out of the mobile management entity pool 108, the method 300 can return to operation 302, and the server computer 102 can again determine a geographic location associated with the eNodeB 120. It therefore can be appreciated that operations 302-304 can be repeated until the server computer 102 determines, in any iteration of operation 304, that the eNodeB 120 has moved out of the mobile management entity pool 108. If the server computer 102 determines, in operation 304, that the eNodeB 120 has moved out of the mobile management entity pool 108, the method 300 can proceed to operation 306.

At operation 306, the server computer 102 can identify a mobile management entity pool 108 associated with the geographic location determined in operation 302. In some embodiments, the server computer 102 can query the location database 130 using the geographic location determined in operation 302, and receive, in response to the query, identification of the mobile management entity pool 108 associated with the location. Because the mobile management entity pool 108 can be identified in additional and/or alternative manners, it should be understood that this example is illustrative and therefore should not be construed as being limiting in any way.

In operation 308, the server computer 102 can add the eNodeB 120 to the mobile management entity pool 108 identified in operation 306. Thus, the server computer 102 can update the location database 130 in operation 308 with data identifying the eNodeB 120 to indicate that the eNodeB 120 is now located in a region or location served by the mobile management entity pool 108 identified in operation 306.

From operation 308, the method 300 can proceed to operation 210 of the method 200 illustrated in FIG. 2, as illustrated in FIG. 3. Thus, it can be appreciated that the eNodeB 120 can be moved into a new mobile management entity pool 108 and the signaling for that eNodeB 120 can be established as explained above with reference to FIG. 2.

According to various embodiments of the concepts and technologies described herein, the functionality illustrated and described herein can be used to provide use SDN techniques to create wireless signal generating networks on demand and/or to create on-demand services. Some contemplated embodiments of how the concepts and technologies described herein can be used are provided below.

In one contemplated embodiment, the concepts and technologies described herein can be used to enable attachment of groups of machine-to-machine ("M2M") devices to a network for various purposes. For example, a large group of M2M devices may need to attach to a network (e.g., an LTE network) to establish communication, to provide one or more emergency notifications, to deliver data (e.g., an emergency patch or software upgrade), or the like. Such an attachment of a large group of devices could affect the network negatively (e.g., consume signaling resources of the network reducing the ability of other users from attaching and/or using the network, etc.). Such traffic saturation also could affect service for many or even all users, thereby negatively impacting the network as a whole. Thus, some embodiments of the concepts and technologies described herein enable dynamic instantiation of virtual mobile management entities 118 to accommodate provisioning and connectivity with peer nodes to enable flexible capacity control of wireless signaling networks to allow service delivery and/or continuity during spikes and/or lulls in demand.

Thus, in some embodiments of the concepts and technologies described herein, the functionality illustrated and described herein for receiving an activation request 124 can identify or specify a group of M2M devices that are to be instantiated, a size of the group, and a geographic location associated with one or more members of the M2M devices. The activation request 124 also can identify one or more virtual mobile management entities 118 that are to be (or have been) activated to meet the needs of the group of M2M devices and one or more associated geographic locations. Additionally, or alternatively, the activation request 124 can specify an expected duration of the attachment of the M2M devices, and as such, a duration of the signaling established by way of the functionality illustrated and described herein can be specified by the activation request. It should be understood that this example is illustrative and therefore should not be construed as being limiting in any way.

In another contemplated embodiment, concepts and technologies described herein, the signaling can be established to support a broadcast of messages, alerts, or the like. For example, an emergency situation (natural or otherwise) may prompt delivery of emergency messages or services to specific locations (e.g., locations affected by the emergency situation, other locations, etc.). The concepts and technologies described herein can be used to quickly establish signaling for new virtual mobile management entities 118 created to support these needs. Furthermore, because the geographic area or region that is to receive the services may span over two or more mobile management entity pools 108, two or more virtual mobile management entities 118 may be created to support the broadcast messages contemplated herein.

Thus, some embodiments of the concepts and technologies described herein can instantiate new virtual mobile management entities 118 and establish signaling for the virtual mobile management entities 118 instead of overloading and/or overriding overload controls associated with existing resources. Thus, the activation request 124 illustrated and described herein can specify an expected duration of the needed resources, a number of resources needed, geographic locations associated with the resources, combinations thereof, or the like. Furthermore, after the broadcast is completed, embodiments of the concepts and technologies described herein can effect teardown of the signaling and resources, thereby freeing resources for other purposes. It should be understood that this example is illustrative and therefore should not be construed as being limiting in any way.

In yet another contemplated embodiment, the signaling can be established to modify quality of service ("QoS") attributes of specific signaling and/or resources associated with that signaling. Thus, while traditionally QoS policies may be present and/or configured for specific signaling and/or resources, the concepts and technologies described herein can establish signaling to establish or even modify QoS associated with resources or the signaling itself. Thus, embodiments of the concepts and technologies described herein can use an activation request 124 to specify a QoS associated with particular signaling (e.g., to specify configurations) or the like. Thus, the activation request 124 can, in addition to requesting establishment of signaling as illustrated and described herein, specify, modify, or delete QoS policies and internal configuration/provisioning attributes on demand. The QoS established by way of the activation request 124 can take into account network conditions, if desired. It should be understood that this example is illustrative and therefore should not be construed as being limiting in any way.

In still another contemplated embodiment, the concepts and technologies described herein can be used to establish and maintain signaling between mobile resources (e.g., drone based eNodeBs 120, or the like) as illustrated and described above with reference to FIG. 4. As such, the activation request 124 illustrated and described herein can be received from various entities and, instead of specifying instantiation of a virtual mobile management entity 118, can specify that an eNodeB 120 or other resource has moved into a new geographic location (or is going to move into the new geographic location). Thus, the activation request 124 can effectively request establishment of signaling between a mobile eNodeB 120 and peer nodes in a mobile management entity pool 108 to which the eNodeB 120 has moved. This activation request 124 can therefore request establishment of a new virtual mobile management entity 118 within the new mobile management entity pool 108, if desired. It should be understood that this example is illustrative and therefore should not be construed as being limiting in any way.

In another contemplated embodiment, the signaling can be established to support communications associated with a disaster situation or other transient spike in demand. For example, a disaster situation may cause a spike in demand at a particular geographic location. To meet this demand, the concepts and technologies described herein can be used to establish additional mobile management entity capacity and associated signaling. Thus, the activation request 124 can request provisioning of a new virtual mobile management entity 118, addition of the virtual mobile management entity 118 to a particular mobile management entity pool 108, and establishment of signaling between the new virtual mobile management entity 118 and peer nodes of the mobile management entity pool 108. Thus, embodiments of the concepts and technologies described herein can reduce impact on customer service and/or experience, even in crisis or disaster situations, where adding physical network function nodes and associated signaling may take weeks, by which time the disaster or crisis situation may have ended. As such, the activation request 124 can specify a geographic location in which a virtual mobile management entity 118 is to be instantiated and establish signaling between the new virtual mobile management entity 118 and the peer nodes in that mobile management entity pool 108. It should be understood that this example is illustrative and therefore should not be construed as being limiting in any way.

In yet another contemplated embodiment, the signaling can be established to support development and/or testing in a pre-deployment or post-deployment environment. In particular, the concepts and technologies described herein can be used to support test interfaces that can be used to support functions that are being tested. Thus, the activation request 124 can specify virtual mobile management entities 118 to be created, a duration of the testing (and therefore the life of the resources being created), and an identification of geographic locations in which the virtual mobile management entities 118 are to be created, and signaling to be established for those virtual mobile management entities 118 and/or peer nodes in the mobile management entity pool 108 associated with the virtual mobile management entity 118. The new resources can be used for testing and torn down, if desired, after testing. It should be understood that this example is illustrative and therefore should not be construed as being limiting in any way.

Figure 5:
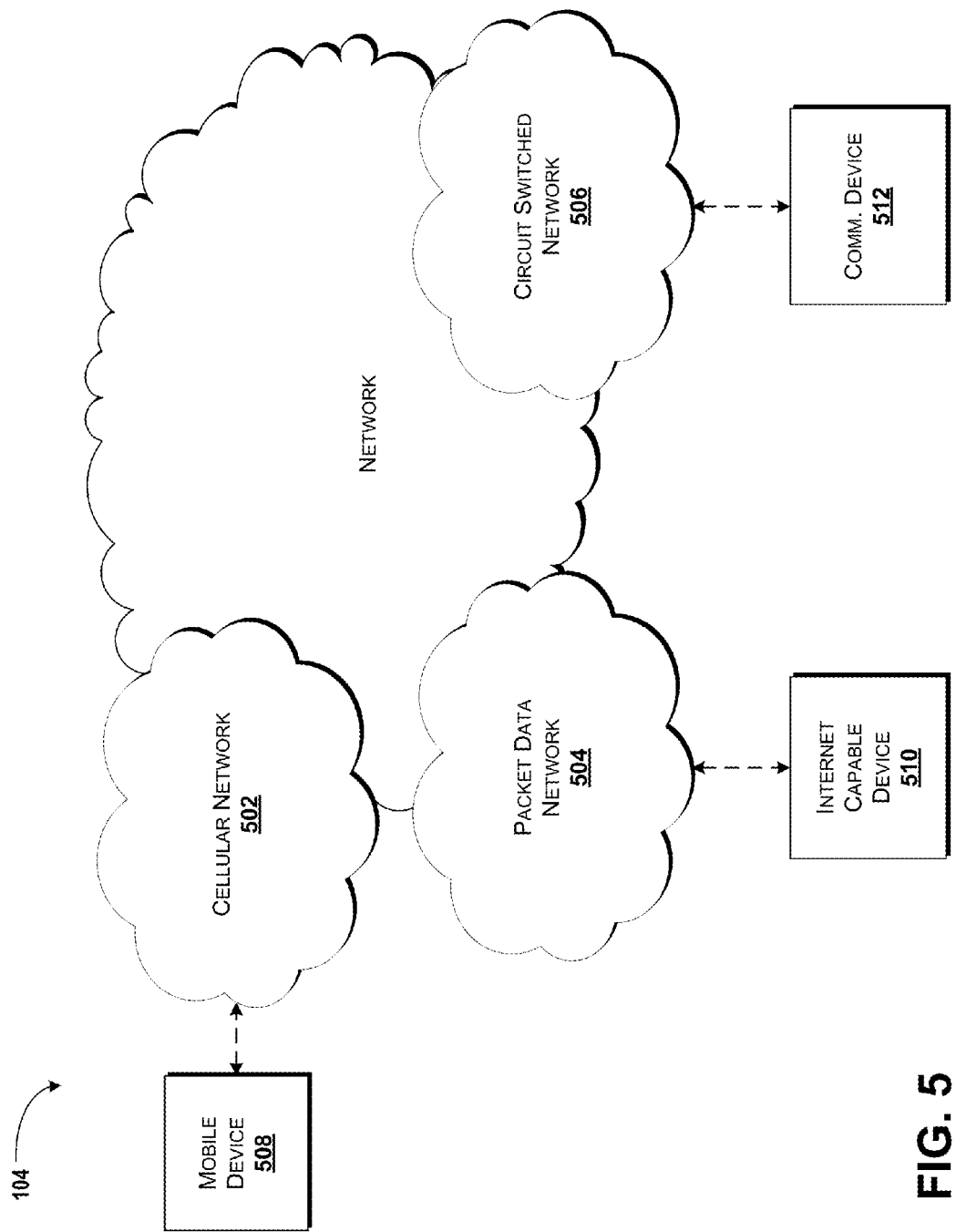
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), NodeBs or eNodeBs, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSDPA), and HSPA+. The cellular network 502 also is compatible with 4G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
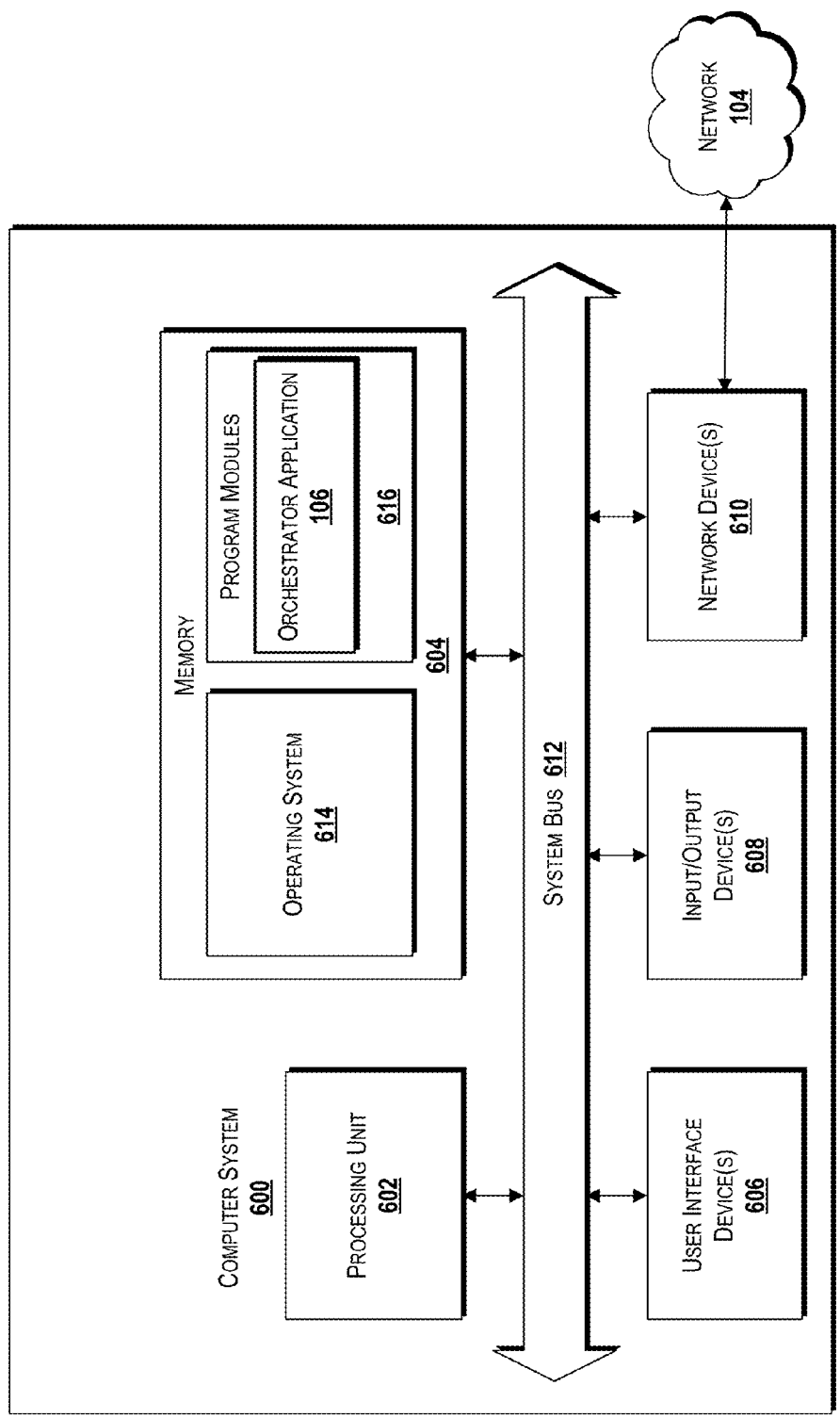
FIG. 6 is a block diagram illustrating an example computer system configured to initiate and update signaling in mobile management entity pools using workflows, according to some illustrative embodiments of the concepts and technologies described herein.

FIG. 6 is a block diagram illustrating a computer system 600 configured to provide the functionality described herein for initiating signaling in mobile management entity pools using workflows, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the orchestrator application 106. This and/or other programs can be embodied in computer-readable media containing instructions that, when executed by the processing unit 602, perform one or more of the methods 200, 300 described in detail above with respect to FIGS. 2-3. According to embodiments, the program modules 616 may be embodied in hardware, software, firmware, or any combination thereof. Although not shown in FIG. 6, it should be understood that the memory 604 also can be configured to store the request 124, the virtual mobile management entity data 128, the location database 130, the workflows 134, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for initiating signaling in mobile management entity pools using workflows have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A device comprising:
a processor; and
a memory that stores computer-executable instructions that, when executed by the processor, cause the processor to perform operations comprising
receiving location data that indicates a geographic location associated with a virtual mobile management entity, obtaining a mobile management entity topology that defines boundaries of a plurality of mobile management entity pools, identifying, by the processor and based on the location data, a one of the plurality of mobile management entity pools in which the virtual mobile management entity is located, identifying pool elements included in the one of the plurality of mobile management entity pools, obtaining a workflow for establishing the pool elements, and requesting establishment of signaling between the virtual mobile management entity and the pool elements.

2. The device of claim 1, wherein the pool elements comprise peer nodes associated with the virtual mobile management entity.

3. The device of claim 1, wherein the computer-executable instructions, when executed by the processor, cause the processor to perform operations further comprising:

detecting a first geographic location associated with an eNodeB, the eNodeB being associated with the virtual mobile management entity;

determining if the first geographic location associated with the eNodeB has changed relative to a second geographic location associated with the eNodeB, the second geographic location being determined using a location database; and in response to determining that the first geographic location has changed, identifying a new mobile management entity pool associated with the first geographic location, and adding the eNodeB to the new mobile management entity pool associated with the first geographic location.

4. The device of claim 3, wherein identifying the new mobile management entity pool comprises mapping the first geographic location to a table stored in the location database, and wherein the table identifies mobile management entity pools and geographic locations associated with the mobile management entity pools.

5. The device of claim 1, wherein the workflow is obtained from an element management system via an application programming interface exposed by the element management system.

6. The device of claim 1, wherein establishing the signaling comprises sending, to the pool elements, configuration information used to establish the signaling.

7. A method comprising:

receiving, by a processor that executes an orchestrator application, location data that indicates a geographic location associated with a virtual mobile management entity;

obtaining, by the processor, a mobile management entity topology that defines boundaries of a plurality of mobile management entity pools;

identifying, by the processor and based on the location data, one of the plurality of mobile management entity pools in which the virtual mobile management entity is located;

identifying, by the processor, pool elements included in the one of the plurality of mobile management entity pools;

obtaining, by the processor, a workflow for establishing the pool elements; and requesting, by the processor, establishment of signaling between the virtual mobile management entity and the pool elements.

8. The method of claim 7, further comprising:

detecting a first geographic location associated with an eNodeB, the eNodeB being associated with the virtual mobile management entity;

determining if the first geographic location associated with the eNodeB has changed relative to a second geographic location associated with the eNodeB, the second geographic location being determined using a location database; and in response to determining that the first geographic location has changed, identifying a new mobile management entity pool associated with the first geographic location, and adding the eNodeB to the new mobile management entity pool associated with the first geographic location.

9. The method of claim 8, wherein identifying the new mobile management entity pool comprises mapping the first geographic location to a table stored in the location database, and wherein the table identifies mobile management entity pools and geographic locations associated with the mobile management entity pools.

10. The method of claim 7, wherein the workflow is obtained from an element management system via an application programming interface exposed by the element management system.

11. The method of claim 7, wherein the workflow comprises a directed graph that is executed by an element management system to establish the signaling.

12. The method of claim 7, wherein establishment of the signaling comprises sending, to the pool elements, configuration information that is used to establish the signaling.

13. The method of claim 7, wherein the location data is received with a common language location identifier that identifies the virtual mobile management entity.

14. The method of claim 7, wherein the pool elements comprise peer nodes associated with the virtual mobile management entity.

15. A computer storage medium having computer-executable instructions stored thereon that, when executed by a processor, cause the processor to perform operations comprising:

receiving location data that indicates a geographic location associated with a virtual mobile management entity;

obtaining a mobile management entity topology that defines boundaries of a plurality of mobile management entity pools;

identifying, by the processor and based on the location data, a one of the plurality of mobile management entity pools in which the virtual mobile management entity is located;

identifying pool elements included in the one of the plurality of mobile management entity pools;

obtaining a workflow for establishing the pool elements; and requesting establishment of signaling between the virtual mobile management entity and the pool elements.

16. The computer storage medium of claim 15, wherein the computer-executable instructions, when executed by the processor, cause the processor to perform operations further comprising:

detecting a first geographic location associated with an eNodeB, the eNodeB being associated with the virtual mobile management entity;

determining if the first geographic location associated with the eNodeB has changed relative to a second geographic location associated with the eNodeB, the second geographic location being determined using a location database; and in response to determining that the first geographic location has changed,
   identifying a new mobile management entity pool associated with the first geographic location, and
   adding the eNodeB to the new mobile management entity pool associated with the first geographic location.

17. The computer storage medium of claim 16, wherein identifying the new mobile management entity pool comprises mapping the first geographic location to a table stored in the location database, and wherein the table identifies mobile management entity pools and geographic locations associated with the mobile management entity pools.

18. The computer storage medium of claim 15, wherein the workflow is obtained from an element management system via an application programming interface exposed by the element management system.

19. The computer storage medium of claim 15, wherein establishing the signaling comprises sending, to the pool elements, configuration information used to establish the signaling.

20. The computer storage medium of claim 15, wherein the pool elements comprise peer nodes associated with the virtual mobile management entity.

* * * * *